US011016173B2

(12) United States Patent
Hoffman et al.

(10) Patent No.: US 11,016,173 B2
(45) Date of Patent: May 25, 2021

(54) SYSTEM AND METHODS FOR CALIBRATING AN ANTENNA ARRAY USING TARGETS

(71) Applicant: VAYYAR IMAGING LTD, Yehud (IL)

(72) Inventors: Damian Hoffman, Tzur Yitzhak (IL); Yuval Lomnitz, Herzelia (IL); Jonathan Rosenfeld, Ramat hasharon (IL)

(73) Assignee: VAYYAR IMAGING LTD., Yehud (IL)

( * ) Notice: Subject to any disclaimer, the term of this patent is extended or adjusted under 35 U.S.C. 154(b) by 574 days.

(21) Appl. No.: 15/569,830

(22) PCT Filed: Apr. 27, 2016

(86) PCT No.: PCT/IL2016/050444
§ 371 (c)(1),
(2) Date: Oct. 27, 2017

(87) PCT Pub. No.: WO2016/174679
PCT Pub. Date: Nov. 3, 2016

(65) Prior Publication Data
US 2019/0025403 A1    Jan. 24, 2019

Related U.S. Application Data

(60) Provisional application No. 62/153,106, filed on Apr. 27, 2015.

(51) Int. Cl.
*G01S 7/40* (2006.01)
*H04B 17/12* (2015.01)
(Continued)

(52) U.S. Cl.
CPC ............... *G01S 7/40* (2013.01); *G01S 7/024* (2013.01); *G01S 7/4021* (2013.01);
(Continued)

(58) Field of Classification Search
CPC .............. H04B 17/103; H04B 17/391; H04B 17/3912; H04B 17/21; H04B 17/11–14;
(Continued)

(56) References Cited

U.S. PATENT DOCUMENTS 2,735,070 A    2/1956    Riblet
4,010,715 A    3/1977    Robar et al.
(Continued)

FOREIGN PATENT DOCUMENTS

EP    1845364 A2    10/2007
GB    2318010 A  *  4/1998    ........... G01S 7/4052
(Continued)

OTHER PUBLICATIONS

Wirth, W. (2001). Radar Techniques Using Array Antennas. United Kingdom: Institution of Engineering and Technology. (Year: 2001).*
(Continued)

*Primary Examiner* — Matthew M Barker
(74) *Attorney, Agent, or Firm* — Browdy and Neimark, PLLC (57) ABSTRACT

Systems, device and methods are provided for calibrating an antenna array comprising a plurality of antennas such as a plurality of transmit and receive antennas by utilizing an arena comprising one or more targets and a medium. The methods may comprise transmitting a plurality of Radio Frequency (RF) signals from at least one RF antenna of a plurality of RF antennas towards an arena, obtaining by the antenna array affected multiple RF signals from the arena, measuring the plurality of reflected RF signals by a Radio Frequency Signal Measurement Unit (RFSMU) and calculating a plurality of channel responses from said plurality of affected RF signals, providing by at least one processing unit a first model, which is configured to produce an expected electromagnetic (EM) channel responses of the antenna
(Continued)

array and the arena and providing a second model, which comprises a relation between the first model and the antenna array calibration parameters and calculating the array calibration parameters to calibrate the antenna array.

16 Claims, 8 Drawing Sheets

(51) Int. Cl.
  *H04B 17/391*   (2015.01)
  *H04B 17/10*   (2015.01)
  *G01S 7/02*   (2006.01)
  *G01S 13/00*   (2006.01)

(52) U.S. Cl.
  CPC .......... *G01S 13/003* (2013.01); *H04B 17/103* (2015.01); *H04B 17/12* (2015.01); *H04B 17/391* (2015.01); *H04B 17/3912* (2015.01)

(58) Field of Classification Search
  CPC . G01S 7/024; G01S 13/003; G01S 7/40–4026
  See application file for complete search history.

(56) References Cited

U.S. PATENT DOCUMENTS

| | | | |
|---|---|---|---|
| 4,211,224 A | 7/1980 | Kubach | |
| 4,211,911 A | 7/1980 | Dehn | |
| 4,626,805 A | 12/1986 | Jones | |
| 5,039,824 A | 8/1991 | Takashima | |
| 5,101,163 A | 3/1992 | Agar | |
| 5,389,735 A | 2/1995 | Bockelman | |
| 5,572,160 A | 11/1996 | Wadell | |
| 5,583,510 A | 12/1996 | Ponnapalli | |
| 5,718,208 A | 2/1998 | Brautigan | |
| 5,774,801 A | 6/1998 | Li et al. | |
| 5,829,522 A | 11/1998 | Ross | |
| 6,636,816 B1 | 10/2003 | Dvorak et al. | |
| 7,034,548 B2 | 4/2006 | Anderson et al. | |
| 7,148,702 B2 | 12/2006 | Wong et al. | |
| 7,387,010 B2 | 6/2008 | Sunshine | |
| 7,448,880 B2 | 11/2008 | Osaka | |
| 7,668,046 B2 | 2/2010 | Banker | |
| 7,755,010 B2 | 7/2010 | Godshalk | |
| 8,050,740 B2 | 11/2011 | Davis | |
| 8,095,204 B2 | 1/2012 | Smith | |
| 8,494,615 B2 | 7/2013 | Melamed et al. | |
| 8,593,337 B2 * | 11/2013 | Ookawa | H01Q 3/36 342/165 |
| 8,620,238 B2 | 12/2013 | Chan et al. | |
| 8,692,707 B2 * | 4/2014 | Lee | G01S 7/4052 342/174 |
| 8,957,808 B2 * | 2/2015 | Ookawa | G01S 7/4004 342/165 |
| 9,568,593 B2 * | 2/2017 | Ahmed | G01S 13/89 |
| 9,594,154 B2 * | 3/2017 | Henderer | G01S 7/4004 |
| 9,618,616 B2 * | 4/2017 | Kishigami | G01S 7/2923 |
| 2002/0165295 A1 | 11/2002 | Matsumoto | |
| 2003/0146767 A1 | 8/2003 | Steele | |
| 2004/0051790 A1 | 3/2004 | Tamaru et al. | |
| 2004/0077943 A1 | 4/2004 | Meaney | |
| 2004/0162700 A1 | 8/2004 | Rosenberg et al. | |
| 2004/0190377 A1 | 9/2004 | Lewandowski | |
| 2005/0040832 A1 | 2/2005 | Steele et al. | |
| 2005/0255276 A1 | 11/2005 | Bethune | |
| 2006/0058678 A1 | 3/2006 | Vitek et al. | |
| 2006/0176062 A1 | 8/2006 | Yang et al. | |
| 2006/0220658 A1 | 10/2006 | Okamura | |
| 2008/0296306 A1 | 12/2008 | Handa | |
| 2009/0270718 A1 | 10/2009 | Peter et al. | |
| 2009/0273792 A1 | 11/2009 | Hullin et al. | |
| 2009/0309786 A1 | 12/2009 | Stolpman et al. | |
| 2011/0060215 A1 | 3/2011 | Tupin | |
| 2011/0068807 A1 | 3/2011 | Kesil et al. | |
| 2011/0134001 A1 | 6/2011 | Sakata | |
| 2011/0205583 A1 | 8/2011 | Young et al. | |
| 2011/0237939 A1 | 9/2011 | Melamed et al. | |
| 2011/0286648 A1 | 11/2011 | Sharif et al. | |
| 2012/0095343 A1 | 4/2012 | Smith et al. | |
| 2012/0242341 A1 | 9/2012 | Olsson | |
| 2012/0327666 A1 | 12/2012 | Liu et al. | |
| 2013/0141287 A1 | 6/2013 | Pallonen | |
| 2013/0231046 A1 | 9/2013 | Pope | |
| 2013/0241780 A1 | 9/2013 | Amm et al. | |
| 2013/0271328 A1 | 10/2013 | Nickel | |
| 2013/0300573 A1 | 11/2013 | Brown | |
| 2013/0329139 A1 | 12/2013 | Feher | |
| 2014/0051976 A1 | 2/2014 | Rapoport et al. | |
| 2014/0066757 A1 | 3/2014 | Naftali | |
| 2014/0111373 A1 * | 4/2014 | Puzella | G01S 13/4463 342/174 |
| 2014/0179239 A1 | 6/2014 | Nickel | |
| 2014/0212832 A1 | 7/2014 | Fisker et al. | |
| 2015/0049170 A1 | 2/2015 | Kapadia et al. | |
| 2016/0336643 A1 | 11/2016 | Pascolini | |

FOREIGN PATENT DOCUMENTS

| | | | |
|---|---|---|---|
| WO | WO-2013174807 A1 * | 11/2013 | ............. G01S 13/89 |
| WO | 2014/064425 A1 | 5/2014 | |
| WO | 2014/080360 A2 | 5/2014 | |

OTHER PUBLICATIONS

R. Streich et al., "Accurate imaging of multicomponent GPR data based on exact radiation patterns," IEEE Transactions on Geoscience and Remote Sensing, vol. 45, 93-103 (2007).

Crocco L et al: "Early-stage leaking 1-13 pipes GPR monitoring via microwave A tomographic inversion" Journal of Applied Geophysics. Elsevier. Amsterdam. NL. vol. 67. No. 4. Apr. 1, 2009 (Apr. 1, 2009). pp. 270-277. XP026033856.

Ayliffe et al., 'Electric Impedance Spectroscopy' Using Microchannels with Integrated Metal Electrodes IEEE Journal of Microelectromechanical Systems, vol. 8, No. 1, Mar. 1999.

P. Lombardini et al., "Criteria for the Design of Loop-Type 12 Directional Couplers for the L Band" (1956).

Valerie Favry, "Design and Development of a Novel Electronic Sensor for Detecting Mastitis Based on Conductance/Impedance Measurements", Thesis submitted for the Degree o f Master o f Science,Supervised by Prof. Dermot Diamond School o f Chemical Sciences, National centre for Sensor Research Jul. 2004.

Pallavi R. Malamel et al., "Microwave Reflectometry Based Electrical Characterization of Milk for Adulteration Detection", Advance in Electronic and Electric Engineering, ISSN 2231-1297, vol. 4, No. 5 (2014), pp. 487-492.

\* cited by examiner

SYSTEM AND METHODS FOR CALIBRATING AN ANTENNA ARRAY USING TARGETS

CROSS-REFERENCE

The present application claims the benefit of U.S. Provisional Application Ser. No. 62/153,106, filed on Apr. 27, 2015, entitled "DEVICE AND METHOD FOR CALIBRATING AN ANTENNA ARRAY", the entire disclosures of which are incorporated herein by reference. The subject matter of the present application is related to PCT Application PCT/IL2015/050126, filed Feb. 4, 2015, entitled "SYSTEM, DEVICE AND METHOD FOR TESTING AN OBJECT", PCT Application PCT/IL2015/050099, filed on Jan. 28, 2015, entitled "SENSORS FOR A PORTABLE DEVICE", U.S. application Ser. No. 14/605,084, entitled "VECTOR NETWORK ANALYZER" U.S. application Ser. No. 14/499,505, entitled "DEVICE AND METHOD FOR CALIBRATING ANTENNA ARRAY SYSTEMS" U.S. application Ser. No. 14/696,813, entitled "PRINTED ANTENNA HAVING NON-UNIFORM LAYERS" each of which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The present invention relates to antenna array systems. In particularly the present invention relates to methods and a system for calibration of antenna array comprising multiple antennas such as MIMO (multiple-input and multiple-output) antenna array.

BACKGROUND OF THE INVENTION

Antenna arrays, such as multi antennas bi-static arrays require precise calibration of the array's antennas and electronic response. This calibration is required for each pair of bi-static antennas and for each frequency, and needs to take into account both the electronic delay and possible mismatch between the antennas and/or the electronics of the array or the device comprising the array, and possible mismatch between the antenna and the object under test (hereinafter: OUT or medium or MUT or sample(s) or material(s) or substance(s)) the antenna is radiating into.

The challenge of short-range sensing or imaging using MIMO antenna arrays calibration relates to the electromagnetic delays for example a delay from antennas to a target or reverberations between the target and the array or between antennas of the array. The delay may be significant, for example of the order of magnitude as the electronic delays (e.g. trace/cable lengths, RF filters and so on), and the typical physical aperture of the array is large compared to the distance of the target, making multiple reflections between the target and the array a non-negligible factor.

The prior art solutions that are currently used to calibrate antenna array, rely on either cable based electronic calibration or antenna to antenna calibration (e.g. self-calibration mechanism).

Cable based electronic calibration methods include connecting each two ports of an antenna in the antenna array by a dedicated cable wherein the cable electronic parameters are known, followed by measuring the electronic response of each antenna port. The disadvantage of these methods include inter alia a separate measurement for each pair of ports. Additionally the calibration measurement does not take into consideration the mismatch induced by the presence of the antenna.

Antenna to antenna calibration according to the prior art solutions include using transmit and receive reference antennas and calculating the response, including mismatch induced by the antennas. The disadvantage of this method is that it requires a number of measurements that is double the number of the antennas. For antenna arrays comprising multiple antennas such as 30, 50 or more antennas, the calibration process might be cumbersome, inefficient and possibly inaccurate. Specifically in regard to measuring and characterizing a medium to obtain the medium parameters or objects within the medium using an antenna array, an antenna to antenna calibration method according to the prior art does not take into account the medium itself, as the antennas should be close to one another to prevent reverberations between the antennas.

In network-analyzer based systems, it is common to model the system using 'signal flow graph' which describes the system's transmitted and reflected signals at the input and output of each component in the system and the component may be modeled using set of transmission and reflection coefficients. Measurement errors are typically caused by the system's routing electronic elements (such as the switches, ports, couplers etc.). In order to compensate the measurement errors a calibration process is required.

In the case of error correction, within the so-called calibration process, devices or objects under test, which are known in part or in their entirety, are measured with regard to reflection and/or transmission behavior. Correction data (so-called error-values or coefficients) are obtained from these measured values, via special computational methods. With these correction data and a corresponding correction calculation, corrected measured values are obtained for every required device under test.

The conventional form of description for the electrical behavior of components and circuits in high-frequency technology is provided via the scattering parameters (also referred to as S-parameters). The scattering parameters relate wave quantities rather than currents and voltages. This presentation is particularly well adapted to the physical circumstances of high-frequency technology. If required, these scattering parameters can be converted into other electrical network parameters, which link currents and voltages.

Antennas are usually characterized in terms of antenna gain (transmission) and of reflection from the antenna feed port only. This characterization disregards the reflection of the incoming radiation from the antenna. These reflections are substantial in measurement systems operating in the near field of the antenna and therefore there is an interest in characterizing the antennas as a full 2-port device.

Figure 1:
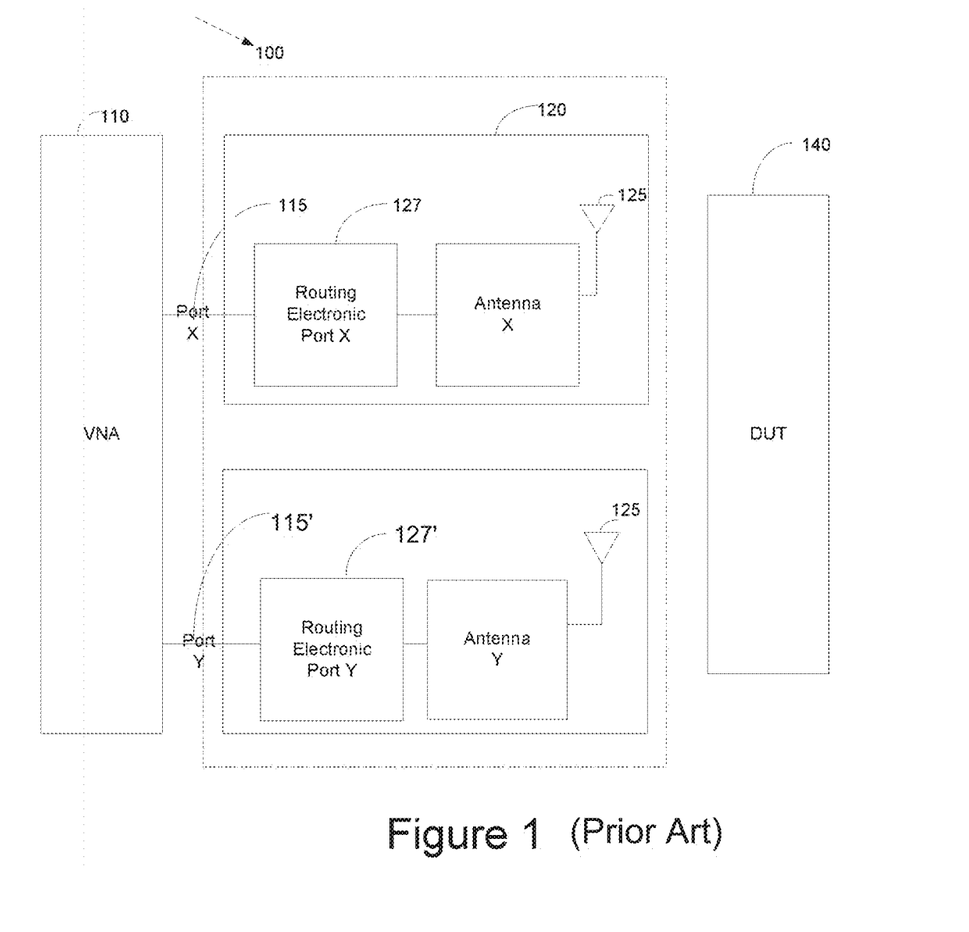
FIG. 1 shows a block diagram of an RF array system according to some embodiments of the prior art.

As shown in FIG. 1 an RF antennas' array system 100, as known in the art comprises three parts: a Radio Frequency (RF) Signals measurement unit such as a VNA 110 configured to generate and transmit a number of RF signals and measure the received/reflected signals; an array unit 120 comprising one or more antennas 125 which transfer the RF signals to propagating a wave in the transmit-path and back in the receive-path; and routing electronic, for example routing electronic port X 127 and routing electronic port Y 127', which comprise RF components such as cables, connectors, splitters, attenuators and switches which are used to connect the network analyzer ports 115 to the antenna array unit 120. The exemplary antenna array system 100 can be a MIMO radar system which characterizes the propertied of a DUT 140 in order to assess its shape or composition from the electromagnetic wave reflections.

SUMMARY OF THE INVENTION

Prior to the summary of the invention being set forth, it may be helpful to set forth definitions of certain terms that will be used hereinafter.

The term 'target' or 'calibration target' as used herein is defined as an object with known electromagnetic scattering properties including bi-static and polarimetric properties. In some cases the calibration target properties are partially unknown but can be derived according to a calibration process. Examples of targets may be, but is not limited to: balls, cube, or wires or planar or curved surfaces various sizes and material such as metal, plastic, air, fat or other organic tissues, wood or other organic materials, and any combination thereof.

The term 'Calibration arena or unit' as used herein is defined as a combination of medium and targets such an object with known electromagnetic scattering properties including bi-static and polarimetric properties for calibrating a device such as an antenna array. In some cases the calibration target properties are partially unknown but can be derived according to a calibration process. Examples of targets may be: balls or wires or planar or curved surfaces of various sizes and material such as metal, plastic, air etc.

The measurement methods, system and apparatus disclosed herein are capable of calibrating an antenna array comprising a plurality of antennas such as a plurality of transmit and receive antennas by utilizing one or more targets and the medium. The calibration process is required for example, for each pair of bi-static antennas and for each frequency. The methods and apparatus can be configured to measure the electronic delay and possible mismatch between the antennas and/or the electronics of the array or the device comprising the array, and possible mismatch between the antenna and the medium (object under test). Additionally, methods, system and apparatus disclosed herein comprise providing a full calibration for the entire array regardless of the number of antennas by measuring transmission and reflection of the antennas and the medium.

The targets' properties used for calibrating the antenna array may be known, unknown or partially known. For example, the target may be any object for which an electromagnetic (EM) response may be measured, such as a metal ball.

Methods and system according to embodiments of the invention include measuring the EM reflections of the target, located in a specific location in respect to the antenna array and analyzing the reflected EM signal to configure a separated EM transmit response (e.g. forward term) and receive response (e.g. reverse term) for each antenna of the antenna array. A further analysis process includes comparing (e.g. simulating) the calculated EM responses to a set of responses which should have been received and configuring the array's full complex EM response (e.g. the antennas EM responses reflected from the medium in time and frequency).

According to a first aspect of the present invention, there is provided a method for calibrating a Radio Frequency (RF) antenna array the RF antenna array comprising a plurality of RF antennas, the method comprising: transmitting a plurality of RF signals from at least one RF antenna of said plurality of RF antennas towards an arena; obtaining by said antenna array affected multiple RF signals from said arena; measuring the plurality of reflected RF signals by a Radio Frequency Signal Measurement Unit (RFSMU) and calculating a plurality of channel responses from said plurality of affected RF signals; providing by at least one processing unit a first model, said first model is configured to produce an expected electromagnetic (EM) channel responses of said antenna array and said arena, the first model comprises the antenna array radiation pattern and EM wave propagation in the arena; providing a second model, said second model comprises a relation between the first model and said antenna array calibration parameters; and calculating said array calibration parameters to calibrate said antenna array.

In an embodiment, the array calibration parameters comprise a least error fit between said plurality of channel responses and the expected EM channel responses.

In an embodiment, the method comprising using symmetry groups in the RF array to estimate a quality of the calibration of said RF array.

In an embodiment, the quality of a calibration of said RF array is measured by similarity in inter-antenna leakage between the plurality of RF antennas of said RF array in a symmetry group.

In an embodiment, the similarity is measured using cross correlation or max difference or variance.

In an embodiment, the method comprising initiating a square error solver to solve a transmit-receive matrix of said RF antenna array.

In an embodiment, the least error fit is a least square error fit.

In an embodiment, the arena comprises at least one medium and at least one target.

In an embodiment, the target shape is selected from the group comprising: ball, cube, wire, planar, curved surfaces.

In an embodiment, the target material is selected from the group consisting of: metal, plastic, air, fat, organic tissues, wood or any combination thereof.

In an embodiment, the at least one target properties are known.

In an embodiment, the at least one target comprises known electromagnetic scattering properties, bi-static properties and polarimetric properties.

In an embodiment, the at least one target properties are partially unknown.

In an embodiment, said at least medium is a lossy medium configured to reduce the effect of a multipath.

According to a second aspect of the invention there is provided a system for calibrating a Radio Frequency (RF) antenna array, the system comprising: an arena, said arena comprising at least one medium and at least one target; a sensing module, the sensing module comprising said antenna array, the antenna array comprising a plurality of antennas, the plurality of antennas are configured to transmit a plurality of RF signals from at least one RF antenna of said plurality of RF antennas towards said arena and obtain affected plurality of RF signals from said arena; a Radio Frequency Signals Measurement Unit (RFSMU) configured to receive said RF responses data and calculate a plurality of channel responses from said plurality of affected RF signals; at least one processing module said at least one processing module is configured to provide a first model and a second model, said first model is configured to produce an expected electromagnetic (EM) channel responses of said antenna array and said arena, the first model comprises the antenna array radiation pattern and EM wave propagation in the arena, said second model comprises a relation between the first model and said antenna array calibration parameters and calculate said array calibration parameters to calibrate said antenna array.

In an embodiment, the array calibration parameters comprise a least error fit between said plurality of channel responses and the expected EM channel responses.

In an embodiment, the antenna array parameters comprises: electromagnetic channel response ($H_{ij}$), an electronic transmit response, ($T_i$) an electronic receive response ($R_j$) an electronic matching response ($B_j$) and an electronic leakage response ($L_j$).

In an embodiment, each of said parameters may be identified separately.

In an embodiment, the system further comprises initiating a quadratic solver to solve a transmit-receive matrix of said RF antenna array using said antenna array parameters and at least one target scattering response of said antenna array.

In an embodiment, the at least one processing module is configured to estimate the quality of said calibration of said RF antenna array using symmetry groups of said plurality of RF antennas.

In an embodiment, the symmetry groups comprise at least one pair of antennas of said plurality of antennas that create a symmetric group in both location and orientation of said plurality of antennas, such that said at least one pair of antennas can be transformed to another pair of antennas of said plurality of antennas using rotation, displacement or mirroring of the antennas pair.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION OF THE INVENTION

The present invention relates to antenna array systems. In particular, the present invention relates to methods and a system for calibration of an antenna array comprising multiple antennas such as MIMO (multiple-input and multiple-output) antenna array.

According to some embodiments of the present invention there is provided a system, device and methods for calibrating an antenna array using one or more targets such as calibration targets (e.g. dedicated calibration known targets). In some cases, the system and methods include utilizing a combination of a medium and known targets. In some cases, the medium may be for example the object or material under test such as liquid e.g. water, oil, organic liquids such as milk, or a combination of thereof, or a solid object such wall for example plaster wall or concrete wall, ground, air, human body or in-vivo body. The targets may be for example an object with known electromagnetic scattering properties including bi-static and polarimetric properties. In some cases, the calibration target properties are partially unknown but can be derived according to a calibration process. Examples of targets may be: balls or wires or planar or curved surfaces of various sizes and material such as metal, plastic, air, fat, or other organic tissues, wood, or other organic materials.

The one or more calibration targets are used for a precise measuring and simulating a transmit and receive channel of the antenna array and for solving the calibration coefficients separately for the transmit and receive channels. The system and methods include using the real antennas, with their unique electrical transmission and mismatches, and their response when radiating or receiving from the specific medium with the medium properties, such as mismatch and losses. This way the calibration can be calculated as precisely as possible, taking into account the real antenna and medium behavior in the specific frequencies being used.

The embodiments disclosed herein can be combined in one or more of many ways to provide improved multiple antennas calibration methods and apparatus. One or more components of the embodiments disclosed herein can be combined with each other in many ways.

Figure 2A:
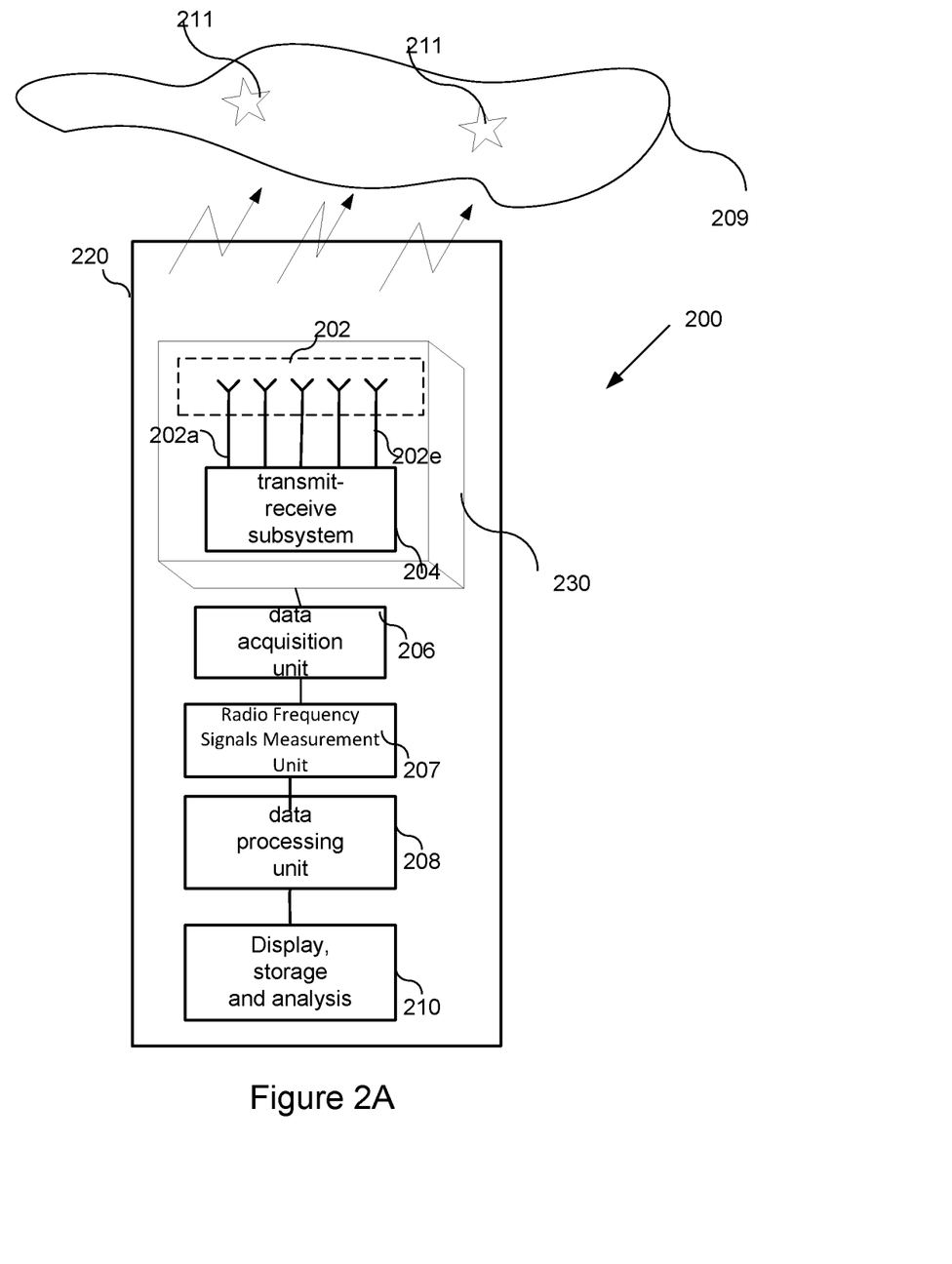
FIG. 2A shows a block diagram of a system according to some embodiments of the invention.

Reference is now made to FIG. 2A illustrating a block diagram of a system 200 such as a MIMO sensing system according to one embodiment of the present invention.

The system 200 comprises a sensing module 230 configured to be attached or included for example in a device such as a portable device 220. According to some embodiments, the portable device 220 may be a handheld device or a handheld computer such as a mobile telephone, a smart phone, a tablet computing device, a laptop computing device, a personal digital assistant, a visible light camera, a personal video device or a music player, personal media player, global positioning system navigational device, pager, portable gaming device or any other appropriate mobile device known in the art. For example, the sensing module 230 may be configured to capture, characterize, image, process, and/or identify, or define a medium such as OUT (object under test) 209 and/or an object such as objects 211 within the medium and provide an identification results relating to the OUT, for example to the device 220 for use in any desired fashion (e.g., for further processing, to store in memory, to display, to use by various applications running on the portable device, to export to other devices, or other uses).

In one embodiment, the sensor module 230 may be a multi-layer structure implemented at least in part with printed circuit board techniques using appropriate dielectric materials. Commonly used materials are glass-epoxy, Teflon-based materials. Layers of high-dielectric-constant materials can be incorporated in order to match the antennas to materials under test.

The system 200 further includes a transmit/receive unit or module 204 configured to generate and transmit the RF signals, for example, from 10 MHz to 10 GHz, to a Radio Frequency Signals Measurement Unit or module (RFSMU) 207 such as the Vector Network Analyzer (VNA) for measuring the received/reflected signals, a data acquisition module or unit 206 and further one or more processor units or modules 208 (e.g. at least one electronic processor unit) for processing the measured signals and characterising the OUT.

According to some embodiments of the invention, the sensing module 230 may include or may be connected to the transmit/receive module 204, the data acquisition module 206, the RFSMU 207 and the data processing module 208 and a console 210.

According to one embodiment of the invention, the sensing module 230 may include one or more antennas such as antenna array 202. For example, the antenna array 202 may include multiple antennas 202*a*-202*e*, for example, a few or several dozen (for example 30) antennas.

In some cases, the antenna array 202 may comprise a plurality of antennas such as transmit or receive or transceiver antennas. In some cases, the array may include more than 10, 20, 30, 40, 50, 60, 70, 80, 90, 100, 200 or more antennas.

The antennas can be of many types known in the art, such as printed antennas, waveguide antennas, dipole antennas or "Vivaldi" broadband antennas. The antenna array can be linear or two-dimensional, flat or conformal to the region of interest. In some cases, the antenna may be any of these or any other type of antennas as known in the art.

According to some embodiment of the invention the antenna array 202 may be an array of flat broadband antennae, for example, spiral-shaped antennae. The antenna array 202 may include a layer of matching material for improved coupling of the antenna radiation to the materials or objects under test. The unique and optimized shape of the antenna array enables their use in limited sized mobile devices, such as a thin, small-sized smart phone or tablet. In addition, the use of an antenna array made as flat as possible, for example, in a printed circuit, allows for the linkage of the sensing module 230 to any mobile device known in the art, as it does not take up much space in the mobile device, it is not cumbersome, nor does it add significant weight to the portable device.

In some cases, the sensing module 230 may be a stand-alone unit, for example attached to or connected to a computer device via wired or wireless connections such as USB connection or Bluetooth™ or any electronic connection as known in the art.

The transmit/receive module 204 is responsible for generation of the microwave signals, coupling them to the antennas 202*a*-202*e*, reception of the microwave signals from the antennas and converting them into a form suitable for acquisition. The signals (e. g. RF signals) can be pulse signals, stepped-frequency signals, chirp signals and the like. The generation circuitry can involve oscillators, synthesizers, mixers, or it can be based on pulse oriented circuits such as logic gates or step-recovery diodes. The conversion process can include down conversion, sampling, and the like. The conversion process typically includes averaging in the form of low-pass filtering, to improve the signal-to-noise ratios and to allow for lower sampling rates. The transmit/receive module 204 can perform transmission and reception with multiple antennas at a time or select one transmit and one receive antenna at a time, according to a tradeoff between complexity and acquisition time.

The data acquisition module 206 collects and digitizes the signals from the transmit/receive module 204 while tagging the signals according to the antenna combination used and the time at which the signals were collected. The data acquisition module will typically include analog-to-digital (A/D) converters and data buffers, but it may include additional functions such as signal averaging, correlation of waveforms with templates or converting signals between frequency and time domain.

An example of algorithm for converting the sets of responses may be for example linear algorithms for reconstructing an image from impulse responses of the medium such as Delay and Sum (DAS), Range Migration Algorithm (RMA), Polar Format Algorithm (PFA) various nonlinear algorithms such as Minimum Variance Method (MVM) or MUltiple SIgnal Classification (MUSIC).

The processing module 208 is responsible for converting the collected signals into a set of responses characterizing the OUT, and performing the algorithms for converting the sets of responses, for example into image data.

Figure 3:
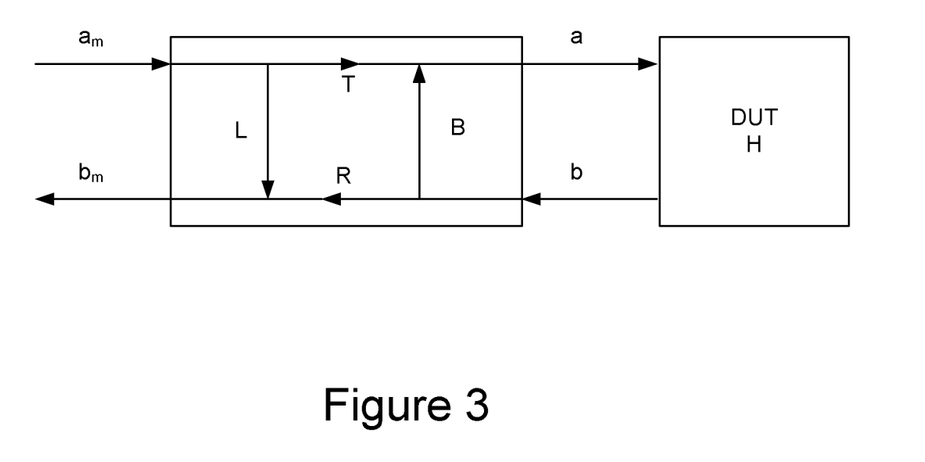
FIG. 3 shows a simplified diagram of a full S-matrix model according to some embodiments of the invention.

The processing module is further responsible for calibrating the system (e.g. the antenna array) in accordance with methods of the present invention as will be further illustrated below in reference to FIGS. 3-5.

Figure 2B:
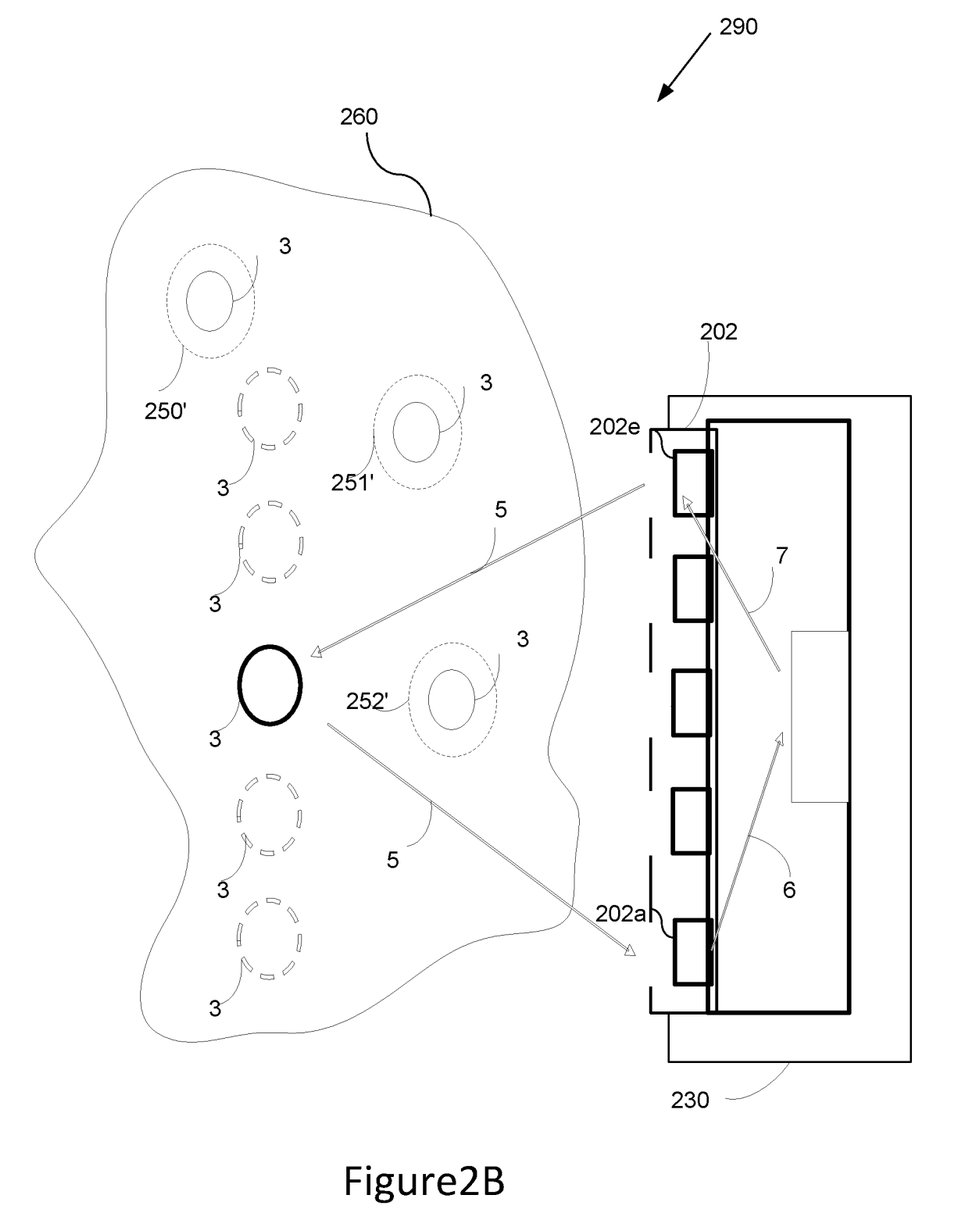
FIG. 2B shows a schematic diagram of a measuring system and calibration targets according to some embodiments of the invention.

FIG. 2B shows a schematic diagram of a measuring system 290 comprising the sensing module 230 according to embodiments. In many embodiments, the system 290 further comprises one or more targets such as targets 3 used for calibration, for example for calibrating the antenna array 202. The targets 3 may be for example at one or more predefined locations 250', 251' and 252'. The targets can be of variable size and distance from the antennas array, related to a Radar Cross Section (RCS) that is identifiable by the system at given distances and at a given medium. One of the requirements, in accordance with embodiments of the invention, is to achieve sufficient Signal to Noise Ratio (SNR) per single bi-static antenna pair, to ensure that the calibration process will have sufficient accuracy. In some cases, the same target may be used in different locations to improve the calibration SNR, even if the SNR is insufficient for a target at a single location.

As mentioned above the sensing module 230 is configured to capture, characterize, image, process, and/or identify, or define a medium such as medium 260 and/or an object such as objects within the medium and provide an identification results relating to the medium.

In some cases, the medium 260 may be placed in front of the antenna array 202 in proximity to the antenna array, for example, a few millimeters from the antenna array (e.g. less than 10 mm). In some cases, the medium may be placed more than 10 mm from the array.

In some cases, the medium may be selected according to the use required of the array. For example, the medium may be or may include dielectric materials to improve the matching of the antennas and to better simulate the intended use of the array for medium estimation or target detection in various media, lossy medium configured to reduce multipath and to reduce mismatch and to better fit the intended use of the system.

In some cases, the medium 260 which is used for calibrating the array 202 may be used to place the targets such as targets 3 at various locations. The locations of the targets are based on the type, number, size of the antenna array and/or the medium and/or the targets. For example, for an antenna array including 15 antennas and a calibration target including a metal ball of a radius of 1 cm, the calibration target should be placed at distances of between 15-30 cm from the center of the array.

In some cases, the targets may be of various shapes, such as balls or wires, or planar or curved of various surfaces, various sizes and materials, such as metal, plastic, air.

It is stressed that the use of targets in the shape of spheres or wires have the advantage of calibrating specific antenna types as these targets have known scattering coefficients that can be modeled using full known analytic or semi analytic electromagnetic models in the modeling phase and exhibit known polarimetric properties which can be used to calibrate cross polarization antennas.

Preferably the targets should be placed in specific locations to reduce ambiguity resulting from the geometrical properties of the array to improve upon the calibration by taking diverse responses from the array and utilizing the array resolution. For example, in a process for calibrating a planar array, the one or more targets may be placed on a line parallel to the main axis of the array, alternatively, the targets may be rotated in front of the array to increase the geometric diversity.

Figure 2C:
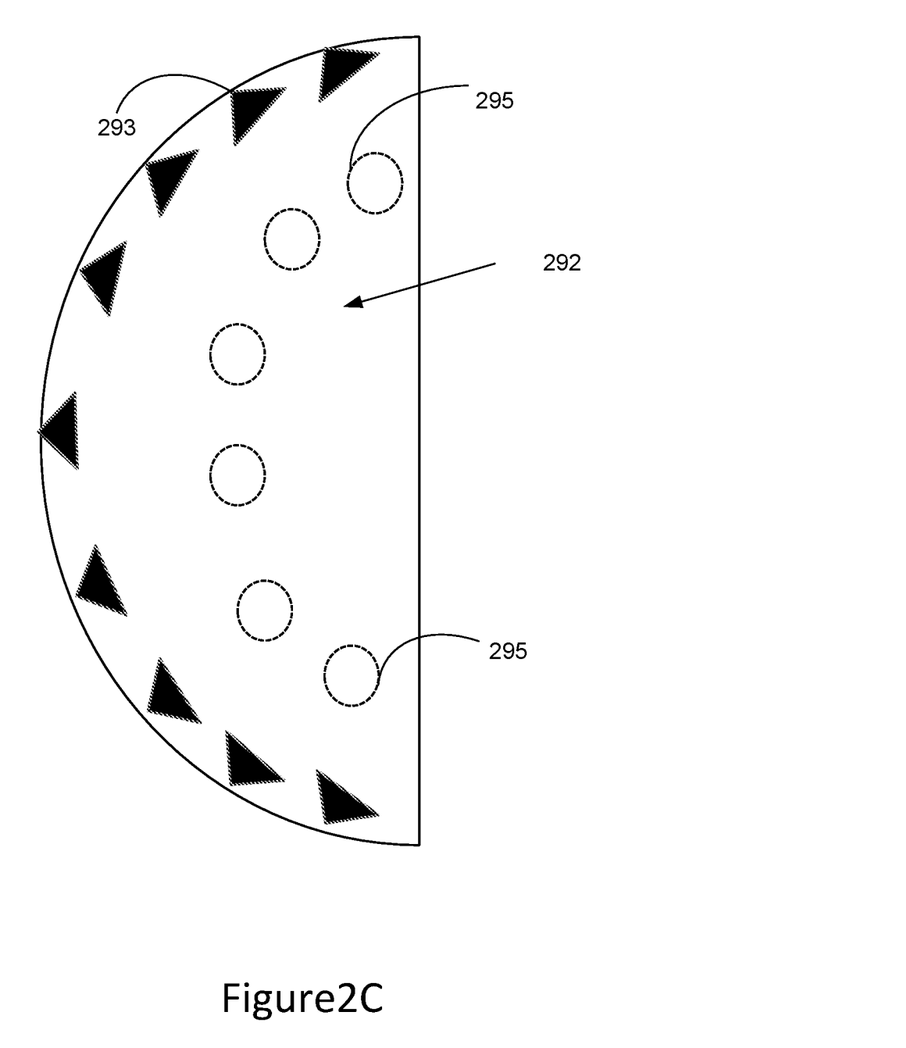
FIGS. 2C-2D show a planner and a curve antenna array according to some embodiments of the invention.
Figure 2D:
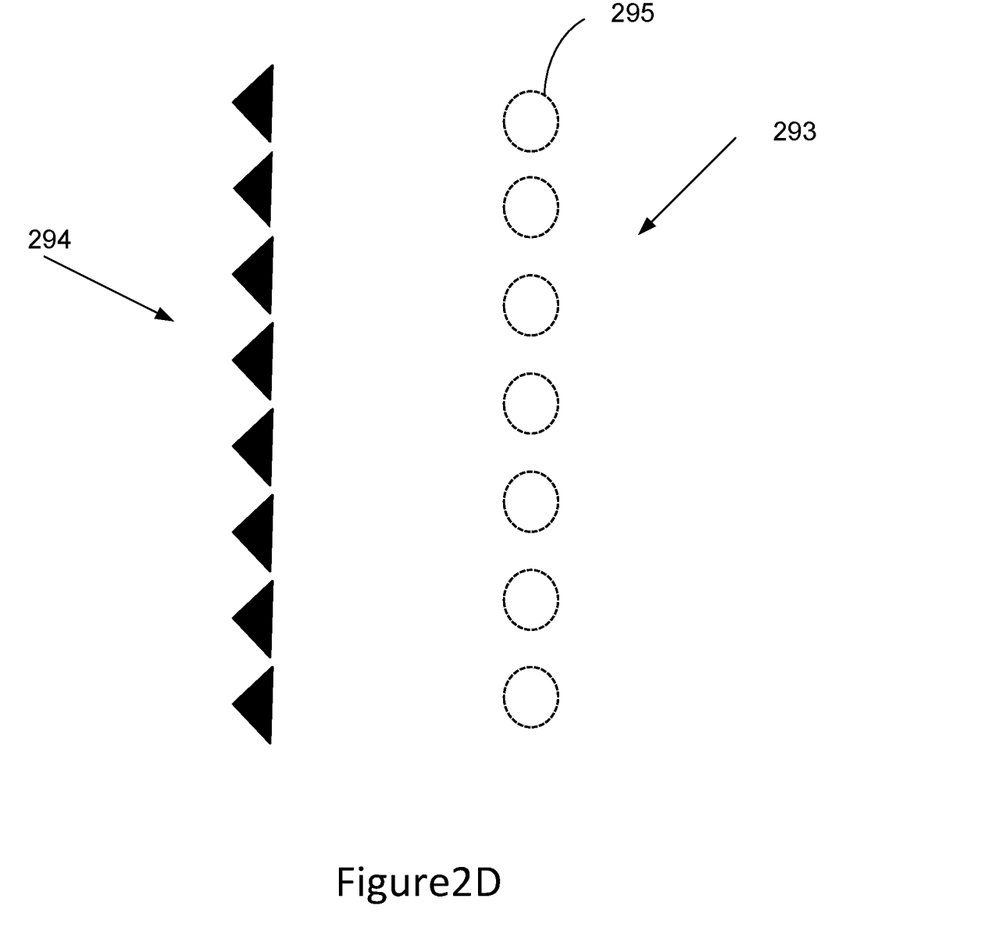

For example, as shown in FIG. 2C for calibrating a curve antenna array 292 comprising a plurality of antennas 295, one or more targets, for example, a set of targets 293, are positioned accordingly in front of the plurality of antennas 295 forming a crescent shape of targets. FIG. 2D shows a planar array 293 comprising a plurality of antennas 295 and accordingly a set of targets 294 are preferably positioned in a row (e.g. in parallel) in front in parallel to the planar array 293.

Figure 4:
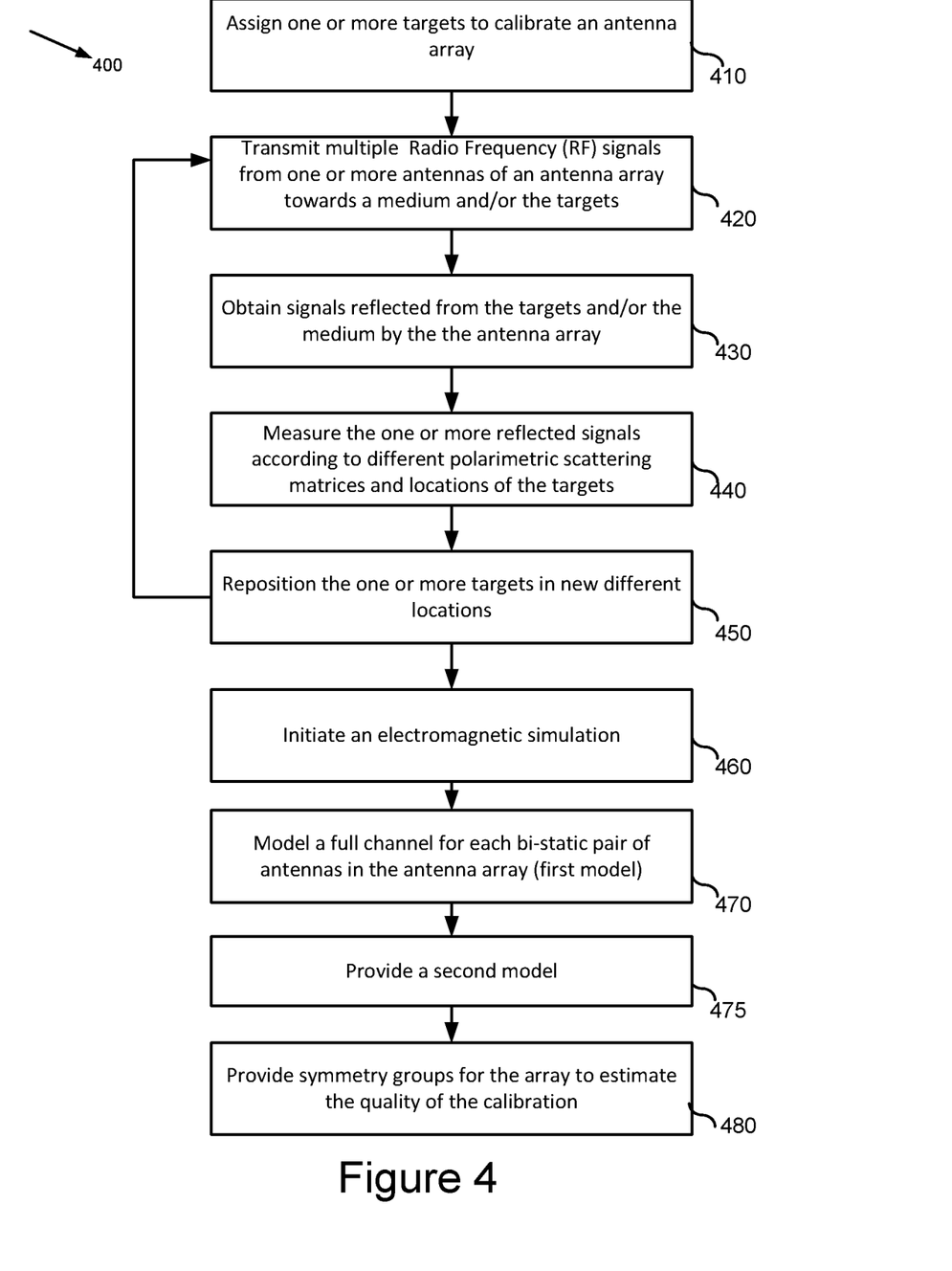
FIG. 4 shows a flow chart of a method for calibrating an antenna array, according to some embodiments of the invention.

FIG. 4 shows a method 400 for a calibration procedure to improve the accuracy of object measurements as provided by an antenna array such as the antenna array of FIGS. 1 and 2, in accordance with embodiments of the invention.

The method of FIG. 4 may be determined using a processor, such as the processor module of FIG. 2. Portions of the processor may be within a sensing module. Additionally, portions of the processor may be at a separate location from the sensing module. The processor may be external to the sensing module, for example in a mobile device such as a smartphone.

An antenna array such as the antenna array 202 of the sensing module 230 may be calibrated at a production site or by the user once the user activates an antenna array such as the antenna array 202 for imaging or sensing a medium as shown in FIG. 2. For example, one or more reference materials with known electromagnetic responses, referred to herein as a "target" reference, may be measured (e.g. imaged) by the sensing module 230.

In step 410, one or more targets may be assigned to an imaging or sensing system for example to the sensing module 230 of system 200 at the production site or as a kit for the user for calibrating an antenna array such as array 202 of the sensing module. The targets may be for example an object with known electromagnetic scattering properties including bi-static and polarimetric properties. In some cases, the targets properties are partially unknown but can be derived according to a calibration process. Examples of targets may be: balls or wires or planar or curved surfaces of various sizes and materials such as metal, plastic, air, fat, or other organic tissues, wood, or other organic materials.

In operation, the targets are placed for example in front of the sensing module 230 and may be imaged or sensed, for example by the system 200 (e.g. and the array 202) using for example an imaging configuration, e.g., a configuration of transmit and receive pairs and resolution bandwidth for imaging or sensing the targets as mentioned above. Examples of systems and methods for imaging a medium may be found in US Patent Application Publication No. US20140066757, entitled "WIDEBAND RADAR WITH HETEROGENEOUS ANTENNA ARRAYS" which application is incorporated by reference herein in its entirety.

In step 420, multiple Radio Frequency (RF) signals are transmitted from one or more antennas of an antenna array such as antenna array 202 to the medium and/or the targets. For example, a signal may be transmitted from a single antenna and may be received by one or more antennas. In other cases, one or more signals may be transmitted from several antennas such 3 or 4 antennas and may be received by other antennas of the array. In some cases, the transmitting and receiving antennas may be the same antennas.

In step 430 the signals reflected or affected from or by the targets and/or the medium are obtained for example by the receive antennas of the antenna array and in step 440 the one or more targets are measured (e.g. imaged), for example, by the data acquisition module 206, according to different polarimetric scattering matrices at one or more locations of the measured medium. For example, in operation, one or more signals, are transmitted from one or more of the array' antennas (e.g. antennas 202) and are later received by one or more other antennas in the antenna array. The number of transmitting and receiving antennas may vary from few antennas to several dozen of antennas.

For example, in reference to FIG. 2B of the present invention, an electromagnetic channel response—$H_{ij}(5)$, an Electronic transmit response—$T_i$(Forward term (6)), an Electronic receive response—$R_j$ (Reverse term (7)), an Electronic Matching response—$B_j$ an Electronic Leakage response—$L_j$ (Directivity term) and Possible target locations (e.g. locations 251' 252') are provided by the system 200 (e.g. and further to the processing module) by solving a full transmission and reflection equations relating to the measurements of the electromagnetic channel response—as simulated in step 460, according to the measurements received.

In step 450 the one or more targets are repositioned and placed in new different locations, and steps 420 to 450 (or some of the steps) are repeated to generate a plurality of measurements to calibrate the antenna array. For example, for a linear array, the targets could be moved along lines parallel to the array or moved along line perpendicular to the array. In some cases, only some of the targets are repositioned for example only one of the multiple targets is repositioned. In some cases, almost all targets are repositioned. The measurements and images of the targets in the different locations are saved for example at the data acquisition module 206.

It is stressed that the number of targets locations is selected to increase the geometric diversity of the imaging and calibration process (as will be specified herein below), and is not correlated to the number of the antennas in the array, or the number of bi-static pairs. A full calibration for the entire array, regardless of the number of antennas and bi-static pairs can be achieved using a single target at a single location.

In step 460 once all the required measurements have been acquired and received for example at the data acquisition module 206, electromagnetic simulation is initiated for example by the processing module 208. According to embodiments of the invention, the simulation process comprises calculating a transmit channel, properties of the target, such as the bi-static and polarimetric scattering properties and the receive channel (e.g. the electromagnetic channel response)—$H_{ij}$ (5) for each measurement and for each bi-static pair of antennas of the antenna array comprises antenna array radiation pattern, EM wave propagation.

In some cases the simulation includes: an antenna, such as antennas 202 radiation pattern or near field pattern, full channel response including but not limited to media induced path-loss, geometric space loss and the electromagnetic properties of the target itself including the full scattering matrix. The simulation may be a full electromagnetic simulation (using electromagnetic simulation such as finite elements methods), or approximate model (such as a far-field model incorporating separate modeling for the antenna, the target and the path to the target). Minor errors in the simulation will be averaged-out in the calibration process.

In step 470 a full channel is modeled (e.g. a first model) for each bi-static pair of antennas, for example in the following way: a transmit response including the electronic response and possible error in the antenna simulation, the simulated channel and the receive response. The transmit and receive responses (e.g. the electronic transmit response)—$T_i$(Forward term (6)), and Electronic receive response—$R_j$ (Reverse term(7)), are unknown, and the calibration process according to the invention includes measuring and estimating these responses. For a given antenna pair (i,j) the equation may be presented according to the following Equation:

$$S_{ij}=(TR)_{ij}H_{ij},$$

where $S_{ij}$ being the full channel,
$H_{ij}$ the simulated channel, and
$(TR)_{ij}$ the combined transmit-receive response.

The equation for all the channels is presented as a linear system of equations, $\overline{S}=\overline{TR}\overline{H}$ which may be solved for each $(TR)_{ij}$ separately. The number of equations is simply the number of (i,j) pairs, multiplied by the number of measurements: $N_{pairs} \times N_{measuremnts}$, the number of variables is simply $N_{pairs}$.

In some cases, the problem is modeled, unlike the traditional way, not as a unique transmit-receive response for each pair, but as a multiplication of the transmit and receive responses:
$S_{ij}(f)=R_j(f)H_{ij}(f)T_i(f)$ for each imaging frequency f. For the sake of clarity, we will avoid writing f, and assume that the equations are per each imaging frequency. Thus the problem becomes instead of a linear estimation problem, a quadratic one: $\overline{S}=\overline{R}\overline{H}\overline{T}$.

By converting the problem above to quadratic instead of linear, the ratio between the number of variables (transmit and receive responses) and the number of equations (number of measurements times the number of pairs) is increased by order of the number of the antennas: assuming $N_{antennas}$ antennas and assuming a triangular transmit-receive matrix, the following relations become clear:
$N_{pairs}=(N_{antennas} \times (N_{antennas}-1))/2$, thus, the number of equations is now $(N_{antennas} \times (N_{antennas}-1)) \times N_{measurements}/2$, but the number of variables is $2N_{antennas}$ at most: a transmit and receive response for each antenna.

This means that the ratio of equations to variables is now of the order of $N_{antennas} \times N_{measurements}$, instead of $N_{measurements}$ in the process described above. It should be noted that the process can be used for every type of transmit-receive matrix.

As a result a highly over determined system is provided according to the present invention, enabling to mitigate effects of multi path, and errors in modeling and target placement. Additionally, this means that the more antennas there are in the array, the more accurate the estimated calibration will be. Therefore, the methods according to the invention are advantageously useful for arrays with large number of antennas, for example more than 3, 4, 5, 6, 7, 8, 9, 10, 20, 30, 40, 50, 60, 70, 80, 90, 100, 200, 300, 1000 antennas.

The performance of calibration is related to a transmit-receive matrix, having in location (i,j) the total or maximum power expected by the model for transmission with element i and reception with element j, over all training measurements for a given target scattering matrix. As will be explained herein below, the structure of this matrix determines whether the problem can be solved, and thus it can be used as an indicator as to whether additional training measurements, and which type of measurements, are needed.

For example, one can identify that a certain group of antennas is effectively disconnected from other antennas in the sense that the power captured when antennas in the group transmit and antennas in the rest of the array receive, is low. In this case one would devise such a measurement that has non-negligible power for some combination of transmit antennas in the group and receive antennas outside the group.

According to some embodiments of the invention, the iterative mean square error solver may be used to solve the quadratic problem, and the estimator can be initialized in the following several ways:
1. A trivial solution of unity response.
2. A bootstrap method, using the transmit-receive matrix as a graph, and finding all the possible paths connecting all the transmit-receive nodes. This method allows a far superior initialization, and in addition enables to build a transmit-receive matrix with full connectivity, depending on the scattering matrix of the targets:

consider the measurements matrix indicator: $I_{ij}=1$ if ij taken. If we set a response $T_k=1$, all the j's such that $I_{kj}\neq 0$ can be solved by:

$$R_j = \frac{H_{kj}}{S_{kj}T_k}.$$

Once done, we can go over all the i's such that $I_{ij}\neq 0$ and solve $$T_i = \frac{H_{ij}}{S_{ij}R_j} = \frac{H_{ij}S_{kj}T_k}{S_{ij}H_{kj}}$$

This can be done iteratively (for a new transmit channel, find all the receiving channels) until no new improvement can be found. As long as the matrix doesn't have any isolated terms (a subset of (i,j) that links only inside the subset)—i.e. has full connectivity all the participating ports can be solve that way. For multiple targets, we use:

$$R_j = \frac{\sum H_{kj}^m S_{kj}^m}{\sum S_{kj}^m S_{kj}^m} \frac{1}{T_k}$$

for target m.

In an embodiment, an automatic process enables the elimination of channel with high estimation error, either due to the array geometry of the target scattering matrix.

Another possible way to deal with multi-paths and cross talk in the array is by truncating the time signals generated from the estimated frequency response: assuming that the transmit or receive response is time limited, we can find an filter in the frequency domain which will reject artifacts in long times, while maintaining the response in the short times.

In step 475 a second model is provided. The second model comprises a relation between the first model (as provided in step 470) and the antenna array calibration parameters. The antenna array calibration parameters include for example a least error fit between the plurality of channel responses and the expected EM channel responses. Specifically, the antenna array calibration parameters include the electromagnetic channel response ($H_{ij}$), the electronic transmit response ($T_i$), the electronic receive response ($R_j$) the electronic matching response ($B_j$) and the electronic leakage response ($L_j$).

In step 480 once an estimation was obtained for the transmit and receive responses, symmetry groups in the array, that is to say, groups of pair that create a symmetric group in both location and antennas orientation, such that one pair can be transformed to another pair using only rotation, displacement or mirroring of the antennas pair. Such symmetry groups can be used to estimate the quality of the calibration, using the inter-antenna leakage as a figure of merit. A quality of the calibration is measured or defined by similarity in inter-antenna leakage between antennas in a symmetry group. Such similarity can be measured using cross correlation, max difference or variance.

It is stressed that the description above focuses on "through" calibration, assuming for example the effect of multiple reflections between the target(s) and the measurement is either negligible, or in large part is independent of the target (e.g., and thus included in to the "T" and "R" terms). However, according to some embodiments, supposing a more elaborate set of measurements is available, including for example couplers are used to distinguish between "forward" and "backward" reflections, the same concept can be used to extract the system's calibration parameters from the target measurements. For example, for a VNA (network-analyzer) style system as shown in FIG. 1, the full S-parameters matrix is measured, and the relation between the estimated S-parameter matrix and the physical S-parameter matrix is given by: $\overline{S}_{measured}=\overline{L}+\overline{R}(I-\overline{H}\overline{B})^{-1}\overline{H}\overline{T}$, where all matrices are $N_{antennas}\times N_{antennas}$, and the matrices $\overline{L}, \overline{T}, \overline{B}, \overline{R}$ define the measurement (electronic) system as illustrated in FIG. 3.

These matrices can be resolved from a set of measured data ($\{\overline{S}_{measured}\}$) contrasted with a set of modeled data $\{\overline{H}\}$. For example, using a similar iterative algorithm, where the initial value of $\overline{B}, \overline{L}$ are 0 and an additional stage in each iteration estimates $\overline{B}, \overline{L}$ from the model and measurements given the current value of $\overline{T}, \overline{R}$.

According to another embodiment of the present invention, the electronic response matrices may be found by least squares solution of an overdetermined set of measurements $\{\overline{S}_{measured}\}$ and modeled DUT data $\{\overline{H}\}$.

In some cases, small deviations in the physical placement of the training targets (i.e. much smaller than the wavelength) are averaged-out by the usage of multiple measurements by the calibration algorithm. Larger deviations (as well as other unknowns) can be accommodated by adding the target locations as additional parameters and restricting their values to a fluctuation around the a-priori given locations/values.

A way to resolve the parameters is by iterating between (A) solving for the port responses using the algorithm described above, as if the target parameters (e.g. locations) are known, and (B) solving for the target parameters given the estimated port responses, while giving a significant weight to the known prior on the target parameters, thereby not allowing the target parameters to significantly deviate from their a-priori given values.

Although the equations presented in the present invention were written for each specific frequency, it should be noted that the same algorithm can be used to solve cases were frequency independent function affect the transmit and receive response. For example, gain variation due to temperature variation during the imaging cycle: $\forall f\ S_{ij}(f)=R_{ij}(f)H_{ij}(f)T_{ij}(f)G_{ij}$. In that example, $G_{ij}$ can be solved in similar method to the one described above, for errors in target location.

Figure 5:
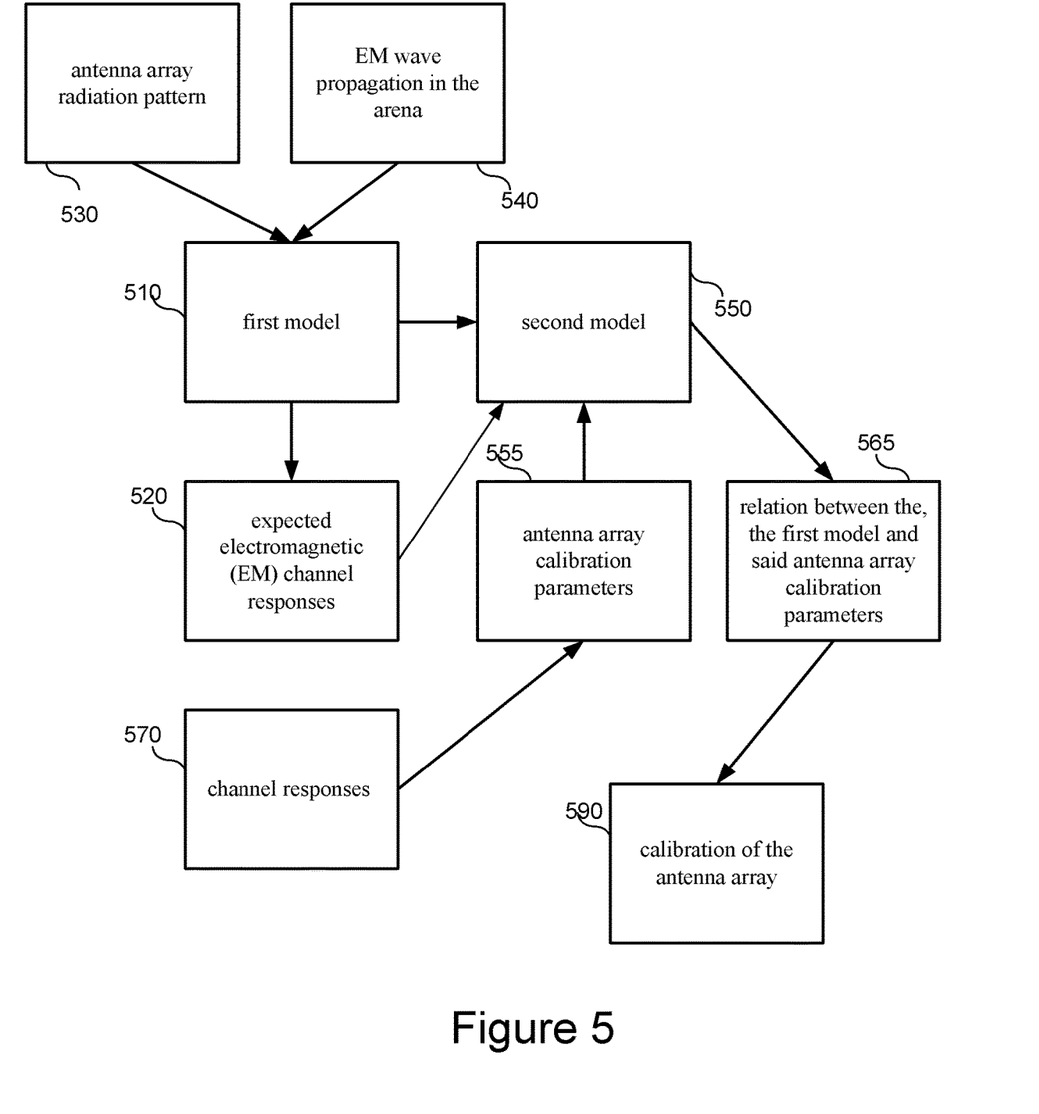
FIG. 5 is a high level schematic block diagram illustrating a system and a method according to some embodiments of the invention.

FIG. 5 is a high level schematic block diagram 500 illustrating elements of the system 200 and method 400, which were illustrated in more detail in FIGS. 2 and 4, according to some embodiments of the invention. In an embodiment, the processing unit, such as the processing unit 160 provides a first model 510. The first model 510 is configured to produce an expected electromagnetic (EM) channel responses 520 of the antenna array and the arena (e.g. the medium and the one or more targets). The first model 510 comprises the antenna array radiation pattern 530 and EM wave propagation in the arena 540.

The processing unit further provides a second model 550 configured to provide parameters for calibrating the antenna array. The second model 550 provides a relation 565 between the first model 510 and the antenna array calibration parameters 555. The calibration parameters 555 comprise for example a least error fit between the plurality of channel responses 570 and the expected EM channel responses 520. Once all the parameters of the second model are obtained and calculated the antenna array is calibrated 590.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for calibrating a Radio Frequency (RF) antenna array, the RF antenna array comprising a plurality of RF antennas, the method comprising:

transmitting a plurality of RF signals from at least one RF antenna of said plurality of RF antennas towards an arena;

obtaining by said antenna array affected multiple RF signals from said arena;

measuring the affected multiple RF signals by a Radio Frequency Signal Measurement Unit (RFSMU) and calculating a plurality of channel responses from said affected multiple RF signals;

producing expected electromagnetic (EM) channel responses of said antenna array and said arena using a first model which comprises the antenna array radiation pattern and EM wave propagation in the arena;

measuring a relation between the expected electromagnetic (EM) channel responses of said antenna array and said arena and antenna array calibration parameters using a second model;

calibrating said antenna array based on said measured relation; and estimating a quality of the calibration of said RF array using symmetry groups in the RF array.

2. The method of claim 1, wherein said array calibration parameters comprise a least error fit between said plurality of channel responses and the expected EM channel responses.

3. The method of claim 2, wherein said least error fit is a least square error fit.

4. The method of claim 1, wherein said quality of a calibration of said RF array is measured by similarity in inter-antenna leakage between the plurality of RF antennas of said RF array in a symmetry group.

5. The method of claim 4, wherein said similarity is measured using cross correlation or max difference or variance.

6. The method of claim 1, comprising initiating a square error solver to solve a transmit-receive matrix of said RF antenna array.

7. The method of claim 1, wherein said arena comprises at least one medium and at least one target.

8. The method of claim 7, wherein said at least one target shape is selected from the group comprising: ball, cube, wire, planar, curved surfaces.

9. The method of claim 7, wherein said target material is selected from the group consisting of: metal, plastic, air, fat, organic tissues, wood or any combination thereof.

10. The method of claim 7, wherein said at least medium is a lossy medium.

11. A system for calibrating a Radio Frequency (RF) antenna array, the system comprising:

an arena, said arena comprising at least one medium and at least one target;

a sensing module, the sensing module comprising said antenna array, the antenna array comprising plurality of antennas, the plurality of antennas are configured to transmit a plurality of RF signals from at least one RF antenna of said plurality of RF antennas towards said arena and obtain affected plurality of RF signals from said arena;

a Radio Frequency Signals Measurement Unit (RFSMU) configured to receive said affected plurality of RF signals and calculate a plurality of channel responses;

at least one processing module providing a first model and a second model, said first model being configured and enabled to produce an expected electromagnetic (EM) channel responses of said antenna array and said arena, the first model comprises the antenna array radiation pattern and EM wave propagation in the arena, said second model being configured and enabled to measure a relation between the first model and antenna array calibration parameters to calibrate said antenna array and further to estimate the quality of said calibration of said RF antenna array using symmetry groups of said plurality of RF antennas.

12. The system of claim 11, wherein said array calibration parameters comprise a least error fit between said plurality of channel responses and the expected EM channel responses.

13. The system of claim 11, wherein said array calibration parameters comprises: electromagnetic channel response $(H_{ij})$, an electronic transmit response $(T_i)$ an electronic receive response $(R_j)$ an electronic matching response $(B_j)$ and an electronic leakage response $(L_j)$.

14. The system of claim 11, further comprising a quadratic solver to solve a transmit-receive matrix of said RF antenna array using said antenna array parameters and at least one target scattering response of said antenna array.

15. The system of claim 11, wherein said symmetry groups comprise at least one pair of antennas of said plurality of antennas that create a symmetric group in both location and orientation of said plurality of antennas, such that said at least one pair of antennas can be transformed to another pair of antennas of said plurality of antennas using rotation, displacement or mirroring of the antennas pair.

16. A system for calibrating a Radio Frequency (RF) antenna array, the system comprising:

an arena, said arena comprising at least one medium and at least one target;

a sensing module, the sensing module comprising said antenna array, the antenna array comprising plurality of antennas, the plurality of antennas are configured to transmit a plurality of RF signals from at least one RF antenna of said plurality of RF antennas towards said arena and obtain affected plurality of RF signals from said arena;

a Radio Frequency Signals Measurement Unit (RFSMU) configured to receive said affected plurality of RF signals and calculate a plurality of channel responses;

at least one processing module providing a first model and a second model, said first model being configured to produce expected electromagnetic (EM) channel responses of said antenna array and said arena, the first model comprises the antenna array radiation pattern and EM wave propagation in the arena, said second model being configured and enabled to measure a relation between the first model and antenna array calibration parameters to calibrate said antenna array, wherein said antenna array calibration parameters comprise: electromagnetic channel response $(H_{ij})$, an electronic transmit response $(T_i)$ an electronic receive response $(R_j)$ an electronic matching response $(B_j)$ and an electronic leakage response $(L_j)$.

\* \* \* \* \*